United States Patent
Shida et al.

(10) Patent No.: US 11,209,811 B2
(45) Date of Patent: Dec. 28, 2021

(54) DIAGNOSTIC DEVICE, DIAGNOSTIC METHOD, AND PROGRAM

(71) Applicant: MITSUBISHI HITACHI POWER SYSTEMS, LTD., Kanagawa (JP)

(72) Inventors: Masato Shida, Kanagawa (JP); Yukihiko Inoue, Tokyo (JP); Kuniaki Aoyama, Tokyo (JP); Ichiro Nagano, Kanagawa (JP); Shun Niizuma, Tokyo (JP); Tomohiro Baba, Kanagawa (JP); Akihisa Endo, Kanagawa (JP); Takahiro Yamauchi, Kanagawa (JP); Tsuyoshi Kinoshita, Kanagawa (JP); Shinsaku Endo, Kanagawa (JP); Yasuoki Tomita, Kanagawa (JP); Katsuhiko Abe, Kanagawa (JP)

(73) Assignee: MITSUBISHI POWER, LTD., Kanagawa (JP)

( * ) Notice: Subject to any disclaimer, the term of this patent is extended or adjusted under 35 U.S.C. 154(b) by 251 days.

(21) Appl. No.: 16/464,134

(22) PCT Filed: Sep. 1, 2017

(86) PCT No.: PCT/JP2017/031535
§ 371 (c)(1),
(2) Date: May 24, 2019

(87) PCT Pub. No.: WO2018/123144
PCT Pub. Date: Jul. 5, 2018

(65) Prior Publication Data
US 2019/0384275 A1    Dec. 19, 2019

(30) Foreign Application Priority Data

Dec. 28, 2016   (JP) .............................. JP2016-257018

(51) Int. Cl.
G05B 23/02    (2006.01)
G07C 5/00     (2006.01)

(52) U.S. Cl.
CPC ....... *G05B 23/0283* (2013.01); *G05B 23/024* (2013.01); *G05B 23/0248* (2013.01); *G05B 23/0254* (2013.01); *G07C 5/008* (2013.01)

(58) Field of Classification Search
CPC ................................................. G05B 23/0283
(Continued)

(56) References Cited

U.S. PATENT DOCUMENTS

2003/0191605 A1* 10/2003 Fujiyama ............... G06Q 10/06
                                                        702/184
2012/0316835 A1* 12/2012 Maeda .................... G01D 3/08
                                                        702/183
(Continued)

FOREIGN PATENT DOCUMENTS

JP         11-119823         4/1999

OTHER PUBLICATIONS

International Search Report dated Oct. 10, 2017 in International (PCT) Application No. PCT/JP2017/031535.

*Primary Examiner* — Ricky Go
(74) *Attorney, Agent, or Firm* — Wenderoth, Lind & Ponack, L.L.P.

(57) ABSTRACT

A diagnostic device includes a storage unit that stores first information including a first abnormal event which occurred in the past in a plant, a first attribution event that is a cause of the first abnormal event, and a first occurrence probability of the first attribution event, in which a causal relationship between the first abnormal and attribution events is indicated by a tree structure, and second information including a second abnormal event which is supposed to occur in the plant but has not yet occurred, a second attribution event that (Continued)

is a cause of the second abnormal event, and a second occurrence probability of the second attribution event, in which a causal relationship between the second abnormal and attribution events is indicated by a tree structure; and an estimation unit that estimates the cause of the sign of the abnormality, based on the first and second information.

15 Claims, 6 Drawing Sheets

(58) Field of Classification Search
USPC .......................................................... 702/183
See application file for complete search history.

(56) References Cited

U.S. PATENT DOCUMENTS

2014/0344007 A1* 11/2014 Shende .............. G06Q 10/0635
                                                         705/7.27
2015/0067400 A1*  3/2015 Ishii .................... G06F 11/079
                                                          714/37

* cited by examiner

FIG. 5

| | EXHAUST DIFFUSER | FUEL SYSTEM | AIR SYSTEM | COMBUSTION AIR | CONTROL SET | TEMPERATURE DETECTION | FUEL FLOW | ... | CAUSE 416 |
|---|---|---|---|---|---|---|---|---|---|
| LARGE TEMPERATURE DEVIATION OF PART A | 1 | | | | | | | | |
| TEMPERATURE ABNORMALITY OF PART B | | 1 | | | | 1 | 1/10 | | |
| LARGE DIFFERENTIAL PRESSURE OF PART C | 1 | | | | | | | | |
| LARGE AXIS VIBRATION | | | 3 | | | | | | |
| HIGH NOx | | 1 | | | | | | | |
| EXHAUST GAS TEMPERATURE DEVIATION | 3 | | | 1 | 1/10 | | | | |
| TEMPERATURE ABNORMALITY OF PART D | 1 | | | | | | | | |
| ... | | | | | | | | | |
| SENSOR ABNORMAL EVENT 130 | | | 1 | | 1 | | 1 | | |
| SENSOR No. 8151 (STRONG) | | | | | | | | | |
| ... | | | | | | | | | |
| CONTROL SIGNAL No. 1881 | | | | | | | | | |

DIAGNOSTIC DEVICE, DIAGNOSTIC METHOD, AND PROGRAM

TECHNICAL FIELD

The present invention relates to a diagnostic device, a diagnostic method, and a program.

BACKGROUND ART

For example, in plants including power plants and chemical plants, safe and stable operation is desired. In order to prevent beforehand or detect early an occurrence of abnormality in a plant, remote monitoring is performed such that data indicating the operation state is collected from the plant and a sign of abnormality is diagnosed based on the collected data. Then, when the sign of the abnormality is detected, the cause for the sign of the abnormality is estimated.

A failure diagnostic device for inferring a cause of a fault based on control information and a knowledge base has been known (for example, see Japanese Unexamined Patent Application Publication No. 11-119823). In this technique, the knowledge base is a matrix table of failure events (abnormal events) and failure causes related to the failure events. Further, at the intersection points in the matrix table, weighting is given according to the degree of the relationship between the failure event and the failure cause.

In order to prevent beforehand or detect early the occurrence of abnormality in the plant, it is desired to estimate the cause of the sign of the abnormality with high accuracy. For example, in fault tree analysis, it is desirable to precisely express the sign of the abnormality and the cause of the sign of abnormality with a fault tree. Thus, the inventor of the present application has found that it is desirable to include the cause of the sign of the abnormality that is supposed to occur but does not occur yet, in addition to the cause of the sign of the abnormality that occurred in the past, as the causes of the sign of abnormality.

SUMMARY OF THE INVENTION

The present invention has been made in view of such circumstances, and an object of the present invention is to provide a diagnostic device, a diagnostic method, and a program for estimating the cause of the sign of the abnormality with high accuracy.

Solution to Problem

A diagnostic device of the present invention is a diagnostic device which diagnoses a sign and a cause of abnormality of a plant, and includes a reception unit that receives from the plant, operation data indicating an operation state of the plant; a storage unit that stores first information including a first abnormal event which occurred in the past in the plant, at least one or more first attribution events that are causes of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but does not occur yet, at least one or more second attribution events that are causes of the second abnormal event, and a second occurrence probability that is an occurrence probability of the second attribution event, in which a causal relationship between the second abnormal event and the second attribution event is indicated by a tree structure; a diagnostic unit that diagnoses abnormality by detecting the sign of the abnormality in the plant, based on the operation data; and an estimation unit that estimates the cause of the sign of the abnormality, based on the first information and the second information, when the sign of the abnormality is detected and diagnosed as abnormality by the diagnostic unit. The estimation unit estimates the cause of the sign of the abnormality, by making weighting of the first occurrence probability heavier than weighting of the second occurrence probability.

According to this configuration, it is possible to estimate the cause of the sign of abnormality with high accuracy, and it is possible to prevent any trouble in advance.

It is preferable that in the diagnostic device of the present invention, the storage unit stores third information including a third abnormal event that occurred in the past in at least another plant different from the plant, at least one or more third attribution events which are causes of the third abnormal event, and third occurrence probability which is occurrence probability of the third attribution event, in which a causal relationship between the third abnormal event and the third attribution event is indicated by a tree structure, and the estimation unit estimates the cause of the sign of the abnormality, by making the weighting of the first occurrence probability and weighting of the third occurrence probability heavier than the weighting of the second occurrence probability. According to this configuration, by further storing third information of the other plant, it is possible to estimate the cause of the sign of the abnormality with high accuracy.

It is preferable that in the diagnostic device of the present invention, the first information, the second information, and the third information are fault trees, and the estimation unit estimates the cause of the sign of the abnormality by fault tree analysis, when the sign of the abnormality is detected and diagnosed as an abnormality by the diagnostic unit. According to this configuration, it is possible to estimate the cause of the sign of the abnormality with high accuracy.

It is preferable that the diagnostic device of the present invention further includes a first changing unit that changes at least one of the weighting of the first occurrence probability, the weighting of the second occurrence probability, and the weighting of the third occurrence probability, based on an estimation result of the estimation unit. According to this configuration, by appropriately changing the weighting of the occurrence probability, it is possible to estimate the cause of the sign of the abnormality with high accuracy.

It is preferable that in the diagnostic device of the present invention, the first changing unit changes the weighting of the first occurrence probability, when the cause estimated by the estimation unit is the first attribution event. According to this configuration, by appropriately changing the weighting of the occurrence probability, it is possible to estimate the cause of the sign of the abnormality with high accuracy.

It is preferable that in the diagnostic device of the present invention, the first changing unit changes the weighting of the second occurrence probability, when the cause estimated by the estimation unit is the second attribution event. According to this configuration, by appropriately changing the weighting of the occurrence probability, it is possible to estimate the cause of the sign of the abnormality with high accuracy.

It is preferable that in the diagnostic device of the present invention, the first changing unit changes the weighting of the third occurrence probability, when the cause estimated by the estimation unit is the third attribution event. According to this configuration, by appropriately changing the weighting of the occurrence probability, it is possible to estimate the cause of the sign of the abnormality with high accuracy.

It is preferable that the diagnostic device of the present invention further includes an acquisition unit that acquires at least one of update information indicating that a part of the plant is updated and inspection information indicating that the plant is inspected; and a second changing unit that changes at least one of the weighting of the first occurrence probability and the weighting of the second occurrence probability, based on at least one of the update information and the inspection information. According to this configuration, by appropriately changing the weighting of the occurrence probability, it is possible to estimate the cause of the sign of the abnormality with high accuracy.

It is preferable that the diagnostic device of the present invention further includes a display unit that displays a diagnosis result of the diagnostic unit and an estimation result of the estimation unit. According to this configuration, it is possible to display the diagnosis result and the estimation result.

It is preferable that in the diagnostic device of the present invention, the display unit displays a maintenance plan recommended according to the estimation result, and when the estimation result indicates that the parts having low urgency of replacing parts are the cause of the sign of the abnormality, the estimation unit displays the maintenance plan for replacing the parts at a periodic inspection of the plant, on the display unit. According to this configuration, it is possible to further display the maintenance plan.

It is preferable that the diagnostic device of the present invention further includes an editing unit that edits at least one of the first information, the second information, and the third information. According to this configuration, by appropriately changing at least one of the first information, the second information, and the third information, it is possible to estimate the cause of the sign of abnormality with high accuracy.

A diagnostic method of the present invention is a diagnostic method for diagnosing a sign and a cause of abnormality of a plant, including a reception step of receiving from the plant, operation data indicating an operation state of the plant; a storage step of storing first information including a first abnormal event which occurred in the past in the plant, at least one or more first attribution events that are causes of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but does not occur yet, at least one or more second attribution events that are causes of the second abnormal event, and a second occurrence probability that is an occurrence probability of the second attribution event, in which a causal relationship between the second abnormal event and the second attribution event is indicated by a tree structure; a diagnostic step of diagnosing abnormality by detecting the sign of the abnormality in the plant, based on the operation data; and an estimation step of estimating the cause of the sign of the abnormality, based on the first information and the second information, when the sign of the abnormality is detected and diagnosed as abnormality in the diagnostic step, in which in the estimation step, the cause of the sign of the abnormality is estimated, by making weighting of the first occurrence probability heavier than weighting of the second occurrence probability.

According to this method, it is possible to estimate the cause of the sign of abnormality with high accuracy, and it is possible to prevent a trouble in advance.

A program according to the present invention is a program for diagnosing a sign and a cause of abnormality of a plant, the program causing a computer to execute: a reception step of receiving from the plant, operation data indicating an operation state of the plant; a storage step of storing first information including a first abnormal event which occurred in the past in the plant, at least one or more first attribution events that are causes of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but does not occur yet, at least one or more second attribution events that are causes of the second abnormal event, and a second occurrence probability that is an occurrence probability of the second attribution event, in which a causal relationship between the second abnormal event and the second attribution event is indicated by a tree structure; a diagnostic step of diagnosing abnormality by detecting the sign of the abnormality in the plant, based on the operation data; and an estimation step of estimating the cause of the sign of the abnormality, based on the first information and the second information, when the sign of the abnormality is detected and diagnosed as abnormality in the diagnostic step, in which in the estimation step, the cause of the sign of the abnormality is estimated, by making weighting of the first occurrence probability heavier than weighting of the second occurrence probability.

According to this program, it is possible to estimate the cause of the sign of abnormality with high accuracy, and it is possible to prevent a trouble in advance.

Advantageous Effects of Invention

According to the present invention, it is possible to realize a diagnostic device, a diagnostic method, and a program for estimating the cause of a sign of abnormality with high accuracy.

BRIEF DESCRIPTION OF DRAWINGS

FIG. 5 is a schematic diagram showing an example of the storage unit shown in FIG. 3.

DESCRIPTION OF EMBODIMENTS

Hereinafter, embodiments of the present invention will be described in detail with reference to the accompanying drawings. It is to be noted that the present invention is not limited to the following embodiments, and can be implemented with appropriate modifications.

First Embodiment

Figure 1:
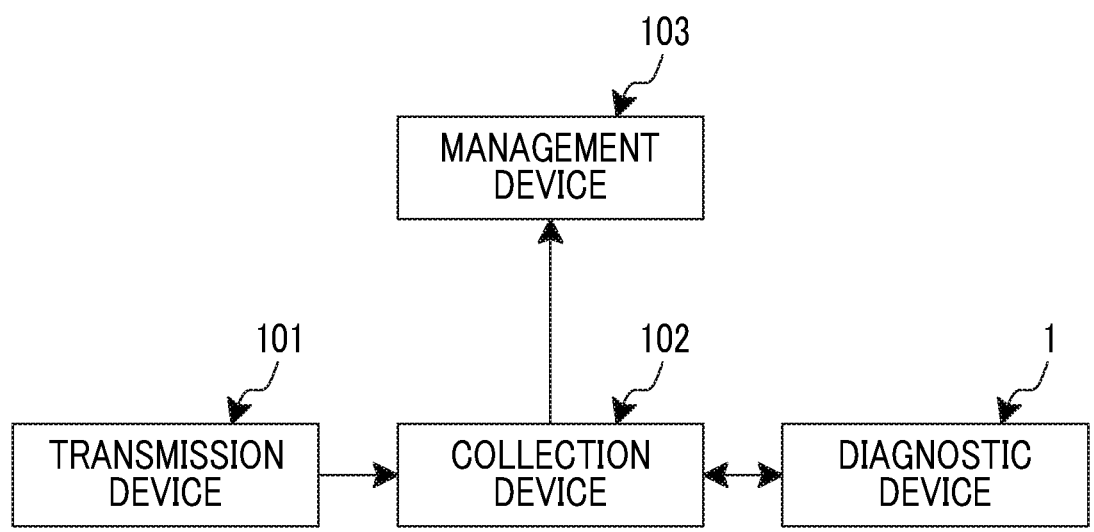
FIG. 1 is a block diagram illustrating a schematic configuration of a diagnostic device according to a first embodiment of the present invention and other devices.

FIG. 1 is a block diagram illustrating a schematic configuration of a diagnostic device according to a first embodiment of the present invention and other devices. A diagnostic device 1 is installed within a site of a service provider that remotely monitors a plant. The diagnostic device 1 diagnoses the sign and cause of abnormality of a plant to be monitored (hereinafter referred to as "host plant"). The diagnostic device 1 receives data from host plant to be monitored through the collection device 102.

The host plant is a plant to be monitored that the diagnostic device 1 diagnoses a sign of abnormality. In the host plant, sensors are disposed in equipment and parts. The sensors transmits operation data indicating the operation state of the host plant to the collection device 102 through the transmission device 101. The operation data includes data necessary for diagnosing the sign of abnormality of the host plant.

The transmission device 101 is installed in the host plant. The transmission device 101 acquires operation data indicating the operation state of the host plant, output from the equipment or the sensors of host plant, and transmits the operation data to the collection device 102 and the management device 103.

The collection device 102 is installed within a site of a service provider that remotely monitors the host plant. The collection device 102 collects operation data output from the equipment and sensors of host plant through the transmission device 101. The collection device 102 transmits the collected operation data to the diagnostic device 1. The collection device 102 receives a diagnosis result from the diagnostic device 1 and transmits the diagnosis result to the management device 103.

The management device 103 is installed within a site of the operating company of the plant. The management device 103 manages data indicating the operation state of the plant and the diagnosis result.

Figure 2:
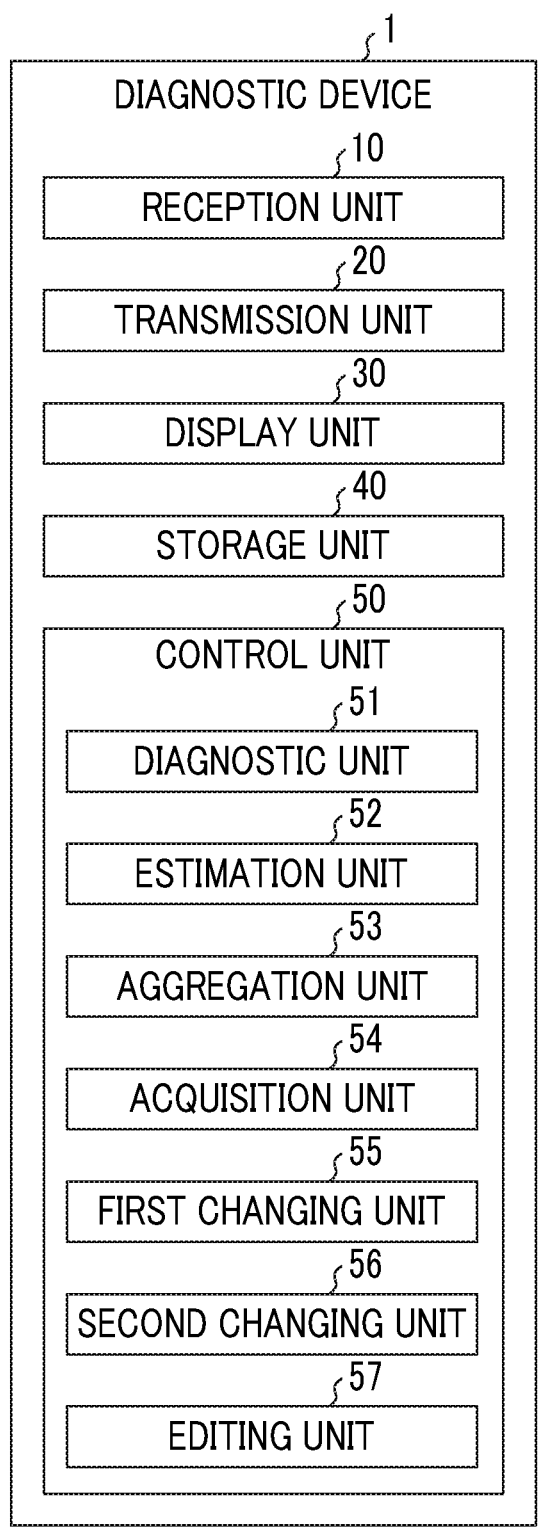
FIG. 2 is a block diagram showing an example of a diagnostic device according to the first embodiment of the present invention.

With reference to FIG. 2, the diagnostic device 1 will be described. FIG. 2 is a block diagram showing an example of a diagnostic device according to the first embodiment of the present invention. The diagnostic device 1 includes a reception unit 10, a transmission unit 20, a display unit 30, a storage unit 40, and a control unit 50.

The reception unit 10 receives operation data indicating the operation state of the host plant from the transmission device 101. More specifically, the reception unit 10 receives the operation data transmitted by the collection device 102.

The transmission unit 20 can transmit data to the collection device 102. The transmission unit 20 transmits the diagnosis result to the collection device 102.

The display unit 30 displays various types of information such as characters and figures. The display unit 30 is, for example, a liquid crystal panel, an organic electro-luminescence (organic EL) panel, a projector, or the like. The display unit 30 displays the diagnosis result, the estimation result, and the maintenance plan.

The storage unit 40 stores various programs and various databases used for executing information processing by the control unit 50. The storage unit 40 stores the received operation data. The storage unit 40 stores the diagnosis result.

Figure 3:
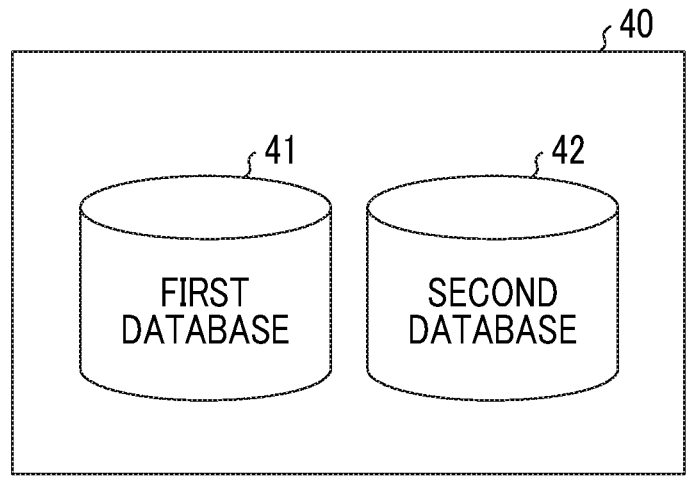
FIG. 3 is a block diagram showing an example of a storage unit of the diagnostic device according to the first embodiment of the present invention.

With reference to FIG. 3, the storage unit 40 will be described in more detail. FIG. 3 is a block diagram showing an example of a storage unit of the diagnostic device according to the first embodiment of the present invention. The storage unit 40 has a first database 41 and a second database 42.

The first database 41 stores a knowledge base based on a sign of abnormality actually occurring in the host plant, which is used for analyzing the cause of a sign of abnormality. In the present embodiment, the first database 41 stores first information that is a fault tree used in fault tree analysis. The first information includes a first abnormal event that is a sign of abnormality occurred in the host plant in the past, at least one or more first attribution events that are the cause of the first abnormal event, and a first occurrence probability which is an occurrence probability of the first attribution event, in which the causal relationship between the first abnormal event and the first attribution event is indicated by a tree structure. The first information includes at least one or more fault trees. For example, the first information may include a fault tree based on knowledge concerning design and manufacture possessed by a service provider and a fault tree based on knowledge concerning operations of the operating company. For example, the first information may be one fault tree for the entire plant or a fault tree for each part. The first information may be generated based on a report on a sign of abnormality or the like.

The second database 42 stores a knowledge base based on a sign of abnormality that is supposed to occur in the host plant but does not occur yet, which is used for analyzing the cause of a sign of abnormality. In the present embodiment, the second database 42 stores second information that is a fault tree used in fault tree analysis. The second information includes a second abnormal event that is the sign of the abnormality which is supposed to occur in the host plant but does not occur yet, at least one or more second attribution events that are the cause of the second abnormal event, and a second occurrence probability which is an occurrence probability of the second attribution event, in which the causal relationship between the second abnormal event and the second attribution event is indicated by a tree structure. The second information includes at least one or more fault trees. For example, the second information may include a fault tree based on knowledge concerning design and manufacture possessed by a service provider and a fault tree based on knowledge concerning operations of the operating company. For example, the second information may be one fault tree for the entire plant or a fault tree for each part.

The first database 41 and the second database 42 may be a combination of the first information of the first database 41 and the second information of the second database 42.

The control unit 50 includes a memory and a CPU. The control unit 50 may be realized by dedicated hardware or may be one that realizes the function by loading a program for realizing the function of the control unit 50 into a memory and executing the program. The control unit 50 includes a diagnostic unit 51, an estimation unit 52, an aggregation unit 53, an acquisition unit 54, a first changing unit 55, a second changing unit 56, and an editing unit 57.

The diagnostic unit 51 diagnoses abnormality by detecting a sign of abnormality in the host plant, based on the operation data. For example, the diagnostic unit 51 uses a Mahalanobis Taguchi Method (MT method). More specifically, the diagnostic unit 51 defines a normal pattern of operation data being multivariate data as a unit space. Then, the diagnostic unit 51 obtains the Mahalanobis distance for the received operation data and detects a sign of abnormality. When detecting the sign of abnormality of the operation data, the diagnostic unit 51 determines the sensor which affects the sign of abnormality according to the magnitude of signal-noise ratio (SN ratio) obtained using the orthogonal table.

When a sign of abnormality is detected by the diagnostic unit 51, the estimation unit 52 uses the fault tree analysis to stochastically estimate an attribution event which is the cause of the sign of abnormality related to the sensor that affects the sign of the abnormality, based on the first information and the second information. The estimation unit 52 stochastically estimates the attribution event, by making the weighting of the first occurrence probability heavier than the weighting of the second occurrence probability (i.e., by weighing the probability of the first occurrence more heavily than the probability of the second occurrence). Because the occurrence probability of the same sign of the abnormality as the sign of the abnormality occurred in the past at the host plant is higher than the occurrence probability of the sign of abnormality which does not occur yet, the weighting of the first occurrence probability is made heavier than the weighting of the second occurrence probability.

For example, the weighting of the first occurrence probability is set to 1, and the weighting of the second occurrence probability is set to 1/10. Further, the weighting of the first occurrence probability of the first attribution event estimated in the past by the estimation unit 52 may be made heavier, that is, set to 3.

The aggregation unit 53 accesses the first database 41 and the second database 42 of the storage unit 40 to read and update data.

The acquisition unit 54 acquires at least one of update information indicating that a part of the host plant is updated and inspection information indicating that the host plant is inspected.

The first changing unit 55 changes at least one of the weighting of the first occurrence probability of the first attribution event and the weighting of the second occurrence probability of the second attribution event, based on the estimation result of the estimation unit 52. When the cause estimated by the estimation unit 52 is the first attribution event, the first changing unit 55 changes the weighting of the first occurrence probability of the estimated first attribution event. When the cause estimated by the estimation unit 52 is the second attribution event, the first changing unit 55 changes the weighting of the second occurrence probability of the estimated second attribution event.

More specifically, when the cause estimated by the estimation unit 52 is the first attribution event, the first changing unit 55 makes the weighting of the first occurrence probability of the estimated first attribution event heavier than that of another first attribution event. For example, when the cause estimated by the estimation unit 52 is the first attribution event, the weighting of the first occurrence probability of the estimated first attribution event is set to 11/10. On the other hand, the weighting of the first occurrence probability of other first attribution events is 1, for example, as described above.

When the cause estimated by the estimation unit 52 is the second attribution event, the first changing unit 55 makes the weighting of the second occurrence probability of the estimated second attribution event heavier than that of other second attribution events which do not occur yet. For example, when the cause estimated by the estimation unit 52 is the second attribution event, the weighting of the second occurrence probability of the estimated second attribution event is set to 1/2. On the other hand, the weighting of the second occurrence probability of other second attribution events which do not occur yet is 1/10, for example, as described above.

The second changing unit 56 changes at least one of the weighting of the first occurrence probability of the first attribution event and the weighting of the second occurrence probability of the second attribution event, corresponding, based on at least one of the update information and the inspection information. For example, when the update information indicating that a part is updated is acquired, the second changing unit 56 changes the weighting of the occurrence probability corresponding to the attribution event related to the updated part, with respect to the first information and the second information. For example, when a permanent countermeasure for updating a part to eliminate the attribution event has been performed, the second changing unit 56 changes the weighting of the occurrence probability corresponding to the attribution event related to the updated part to zero. For example, when the inspection information indicating that a part is inspected is acquired, the second changing unit 56 makes the weighting of the occurrence probability corresponding to the attribution event related to the inspected part lighter, with respect to the first information and the second information.

The editing unit 57 edits the first information of the first database 41 and the second information of the second database 42. For example, when it is desired to change the fault tree such as adding or changing an abnormal event or an attribution event, the first information of the first database 41 and the second information of the second database 42 are directly edited through the editing unit 57.

Figure 4:
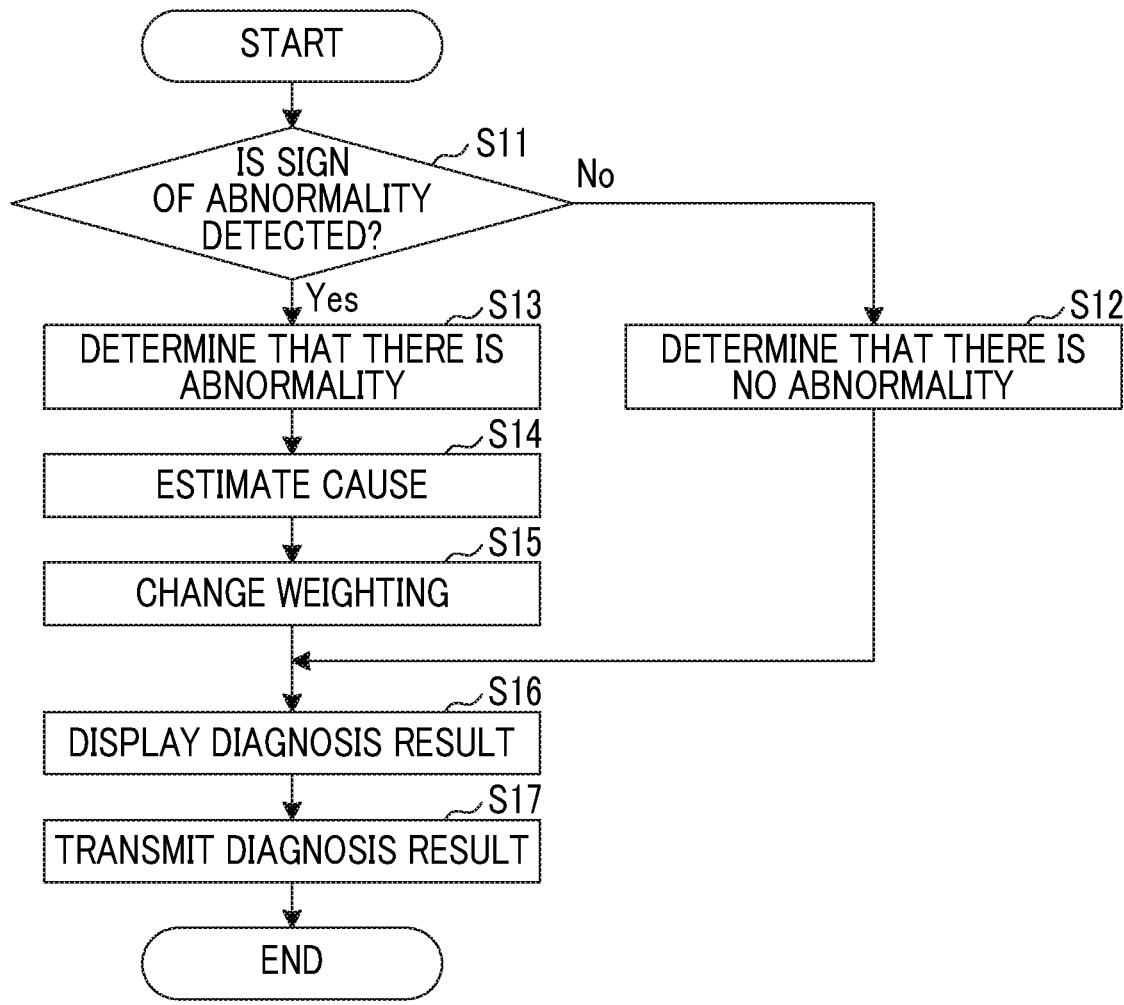
FIG. 4 is a flow diagram schematically illustrating a diagnostic method in the diagnostic device according to the first embodiment of the present invention.
Figure 6:
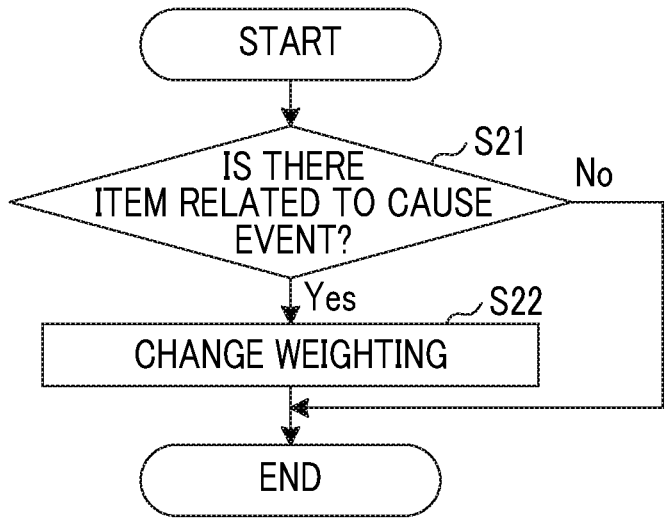
FIG. 6 is a flow diagram showing an example of information processing in the diagnostic device according to the first embodiment of the present invention.

Next, with reference to FIGS. 4 to 6, a diagnostic method using the diagnostic device 1 will be described. FIG. 4 is a flow diagram schematically illustrating a diagnostic method in the diagnostic device according to the first embodiment of the present invention. FIG. 5 is a schematic diagram showing an example of the storage unit shown in FIG. 3. During the activation of the diagnostic device 1, the diagnostic unit 51 constantly monitors the detection of a sign of abnormality.

The control unit 50 determines whether or not a sign of abnormality is detected (step S11). More specifically, in the control unit 50, the diagnostic unit 51 determines whether or not a sign of abnormality of the host plant is detected based on the operation data. When the diagnostic unit 51 detects a sign of abnormality (Yes in step S11), the control unit 50 proceeds to step S13. When the diagnostic unit 51 does not detect a sign of abnormality (No in step S11), the control unit 50 proceeds to step S12.

The diagnostic unit 51 determines that there is no abnormality (step S12). The control unit 50 proceeds to step S16.

The diagnostic unit 51 determines that there is abnormality (step S13). The control unit 50 proceeds to step S14.

In the control unit 50, the estimation unit 52 uses the fault tree analysis to stochastically estimate an attribution event which is the cause of the sign of abnormality corresponding to the sensor that affects the sign of the abnormality, based on the first information and the second information (step S14). The control unit 50 proceeds to step S15.

The process of stochastically estimating the attribution event in step S14 will be described. In the present embodiment, in the control unit 50, the estimation unit 52 stochastically estimates the attribution event using the first information and the second information developed in the matrix table shown in FIG. 5. In the matrix table shown in FIG. 5, the vertical axis represents a sign of abnormality and the horizontal axis represents the cause of sign of the abnormality. Each of items on the horizontal axis of FIG. 5 shows an abbreviation of a cause of a sign of abnormality. For example, "exhaust diffuser" indicates damage to the exhaust diffuser, "fuel system" indicates a failure of the fuel system, "air system" indicates a failure of the air system, "combustion air" indicates a failure of distribution of fuel air, "control set" indicates a defect in the control set value, "temperature detection" indicates a failure of a temperature detector, and "fuel flow" indicates a failure of fuel flow. Although not shown in FIG. 5, the sensors related to the sign of the abnormality are associated with each item on the vertical axis. For each lattice of the matrix table, for example, the weighting of the occurrence probability is set such that the weighting of the first occurrence probability is 1, the weighting of the second occurrence probability is 1/10, and the weighting of the first occurrence probability of the first attribution event that the estimation unit 52 estimated in the past is 3. An attribution event is stochastically estimated, using such a matrix table, by the items on the horizontal axis including the items on the vertical axis corresponding to the sensors estimated by the MT method in the diagnostic unit 51 and weightings thereof.

Specifically, the case where the sensor estimated by the MT method in the diagnostic unit 51 is a sensor corresponding to "large temperature deviation of part A", a sensor corresponding to "large differential pressure of part C", a sensor corresponding to "axial vibration", and a sensor corresponding to "exhaust gas temperature deviation" will be described. In this case, the exhaust diffuser damage which is the item in the first column from the left on the horizontal axis and the defect of the air system which is the item in the third column, including these items, are stochastically estimated as the causes.

When the cause estimated by the estimation unit 52 is the first attribution event, in the control unit 50, the first changing unit 55 changes the weighting of the first occurrence probability of the first attribution event (step S15). When the cause estimated by the estimation unit 52 is the second attribution event, in the control unit 50, the first changing unit 55 changes the weighting of the second occurrence probability of the second attribution event. The control unit 50 proceeds to step S16.

The control unit 50 causes the display unit 30 to display the diagnosis result based on step S12 or step S13 (step S16). When it is determined in step S13 that there is abnormality, the diagnosis result includes the estimation result in step S14. The control unit 50 proceeds to step S17.

The control unit 50 transmits the diagnosis result to the management device 103 (step S17). The control unit 50 ends the process of this flowchart.

In this way, when the diagnostic unit 51 detects a sign of abnormality of a plant, the estimation unit 52 stochastically estimates the cause using the fault tree analysis.

Next, with reference to FIG. 6, the process of changing the weighting in the diagnostic device 1 will be described. FIG. 6 is a flow diagram showing an example of information processing in the diagnostic device according to the first embodiment of the present invention. During the activation, the diagnostic device 1 always monitors whether the acquisition unit 54 acquires the update information indicating that a part of the host plant is updated and the inspection information indicating that the host plant is inspected. Upon acquiring the update information or the inspection information, the control unit 50 executes the processing of the flowchart shown in FIG. 6.

The control unit 50 determines whether or not there is an item related to the cause event (step S21). More specifically, the control unit 50 determines whether or not there is an item related to the acquired update information or inspection information in the first attribution event and the second attribution event. When there is an item related to the acquired update information or inspection information in the first attribution event and the second attribution event (Yes in step S21), the control unit 50 proceeds to step S22. For example, when there is a first attribution event or a second attribution event related to a part included in the update information, the control unit 50 determines as Yes in step S21. For example, when there is a first attribution event or a second attribution event related to a part included in the inspection information, the control unit 50 determines as Yes in step S21. When there is no item related to the acquired update information or inspection information in the first attribution event and the second attribution event (No in step S21), the control unit 50 ends the process of this flowchart.

In the control unit 50, the second changing unit 56 changes the weighting of the first occurrence probability of the first attribution event or the second occurrence probability of the second attribution event related to the part included in the update information, based on the update information (step S22). For example, when the update information indicates that a permanent countermeasure for eliminating the attribution event has been performed, in the control unit 50, the second changing unit 56 changes the weighting of the occurrence probability corresponding to the attribution event related to the updated part to zero. For example, when the inspection information indicates that a part is inspected, in the control unit 50, the second changing unit 56 changes the weighting of the occurrence probability corresponding to the attribution event related to the inspected part to be lighter.

In this way, when the acquisition unit 54 acquires update information or inspection information, the second changing unit 56 changes at least one of the weighting of the first occurrence probability and the weighting of the second occurrence probability.

As described above, according to the present embodiment, when the diagnostic unit 51 detects a sign of abnormality of a plant, the estimation unit 52 estimates the cause using the fault tree analysis. According to the present embodiment, the estimation unit 52 estimates the cause, based on the first database 41 based on the sign of the abnormality actually occurred in the host plant and the second database 42 based on the sign of the abnormality that is supposed to occur in the host plant but does not occur yet, and stochastically estimates the cause, by making the weighting of the first occurrence probability heavier than the weighting of the second occurrence probability. In this way, in the present embodiment, it is possible to estimate the cause of the sign of abnormality with high accuracy, and it is possible to prevent a trouble in advance.

According to the present embodiment, when the cause estimated by the estimation unit 52 is the first attribution event, the weighting of the first occurrence probability of the first attribution event is changed. According to the present embodiment, when the cause estimated by the estimation unit 52 is the second attribution event, the weighting of the second occurrence probability of the second attribution event is changed. In this way, in the present embodiment, it is possible to appropriately change the fault tree used in the fault tree analysis, based on the estimation result of the estimation unit 52. In the present embodiment, it is possible to set the occurrence probability of an abnormal event of each of the first information and the second information to an appropriate value, according to the estimation result of the estimation unit 52. In this way, in the present embodiment, it is possible to estimate the cause of the sign of abnormality with high accuracy.

According to the present embodiment, at least one of the weighting of the first occurrence probability and the weighting of the second occurrence probability is changed, corresponding, based on at least one of the update information and the inspection information. For example, according to the present embodiment, when update information indicating that a part is updated is acquired, the weighting of the occurrence probability corresponding to the attribution event related to the updated part is changed. Further, for example, in the present embodiment, when a permanent countermeasure for updating a part to eliminate the attribution event has been performed, the weighting of the occurrence probability corresponding to the attribution event related to the updated part is changed to zero. For example, in the present embodiment, when the inspection information indicating that a part is inspected is acquired, the weighting of the occurrence probability corresponding to the attribution event related to the inspected part is changed to be lighter. In the present embodiment, it is possible to set the occurrence probability of an abnormal event of each of the first information and the second information to an appropriate value. In this way, in the present embodiment, when a sign of abnormality is detected, it is possible to estimate the cause with high accuracy.

According to the present embodiment, for example, when it is desired to change the fault tree such as adding an abnormal event or an attribution event, the first information of the first database 41 and the second information of the second database 42 can be directly edited through the editing unit 57. In the present embodiment, it is possible to set the occurrence probability of an abnormal event of each of the first information and the second information to an appropriate value. In this way, in the present embodiment, when a sign of abnormality is detected, it is possible to estimate the cause with high accuracy.

Moreover, according to the present embodiment, it is possible to estimate the cause of a sign of abnormality with high accuracy, so it is possible to formulate a maintenance plan with higher cost-effectiveness. For example, when the cause of the sign of abnormality estimated by the estimation unit 52 is such that replacing parts is highly urgent or the degree of influence on the plant operation extends over the entire plant range, it is possible to formulate a maintenance plan for promptly performing maintenance. For example, when the cause of the sign of abnormality estimated by the estimation unit 52 is such that replacing parts is low urgent or the degree of influence on the plant operation is limited, it is possible to formulate a maintenance plan for performing maintenance for replacing parts at the time of periodic inspection. As described above, according to the present embodiment, it is possible to formulate an appropriate maintenance plan.

Second Embodiment

Figure 7:
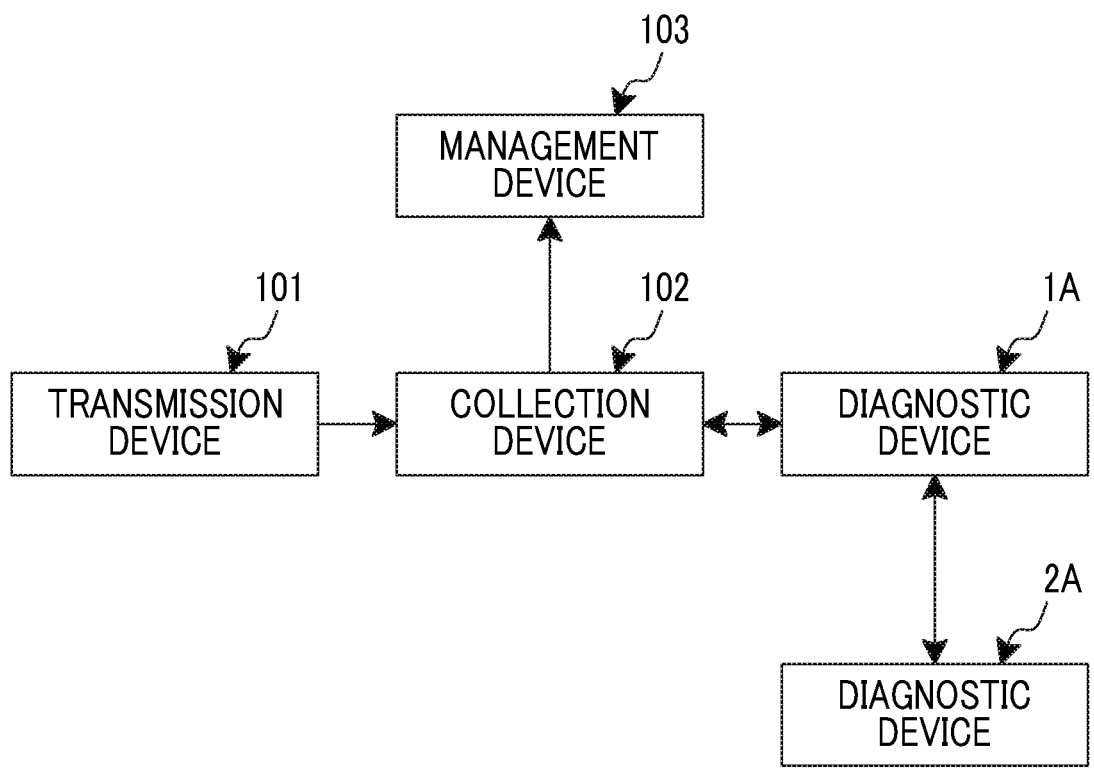
FIG. 7 is a block diagram illustrating a schematic configuration of a diagnostic device according to a second embodiment of the present invention and other devices.
Figure 8:
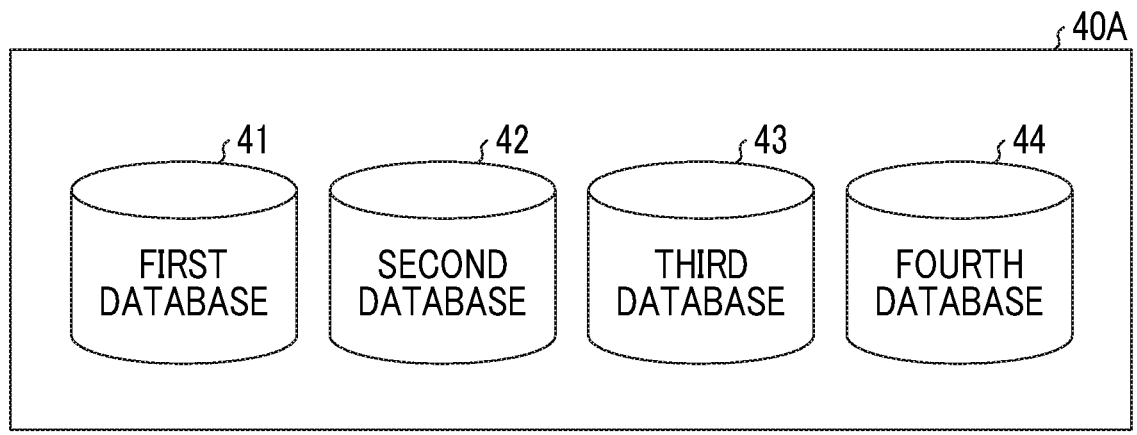
FIG. 8 is a block diagram showing an example of a storage unit of the diagnostic device according to the second embodiment of the present invention.

Next, a diagnostic device 1A according to the present embodiment will be described with reference to FIGS. 7 and 8. FIG. 7 is a block diagram illustrating a schematic configuration of a diagnostic device according to a second embodiment of the present invention and other devices. FIG. 8 is a block diagram showing an example of a storage unit of the diagnostic device according to the second embodiment of the present invention. In the present embodiment, in order to avoid redundant description, portions different from the first embodiment will be described, and portions having the same configuration as in the first embodiment will be denoted by the same reference numerals or corresponding reference numerals.

The diagnostic device 1A is different from the first embodiment in that it acquires the fault tree data of another plant from the diagnostic device 2A of the other plant in addition to the host plant. The other plant is a plant of the same structure having the same type as that of the host plant. The present embodiment will be described with the number of other plants is one.

The diagnostic device 2A is installed within a site of a service provider that remotely monitors another plant. The diagnostic device 2A diagnoses a sign of abnormality of another plant using fault tree analysis, based on operation data of another plant. The diagnostic device 2A stores a fault tree used in the fault tree analysis as a database. The diagnostic device 2A is capable of transmitting and receiving data to and from the diagnostic device 1A. The diagnostic device 2A transmits to the diagnostic device 1A, a first database which is a knowledge base based on the sign of abnormality actually occurring in another plant, which is used for analyzing the cause of the sign of abnormality of another plant. Every time the first database is updated, the diagnostic device 2A transmits the first database to the diagnostic device 1A.

The diagnostic device 1A is capable of transmitting and receiving data to and from the diagnostic device 2A. The diagnostic device 1A receives the first database of the other plant from the diagnostic device 2A.

The reception unit 10 receives data of a fault tree of the other plant from the diagnostic device 2A. More specifically, the reception unit 10 receives the first database of the other plant transmitted by the diagnostic device 2A.

The transmission unit 20 can transmit data to the diagnostic device 2A. When the diagnostic device 1A updates the occurrence probabilities of the third database 43 and the fourth database 44, which will be described later, which are the first databases of another plant, the transmission unit 20 transmits to the diagnostic device 2A, the third database 43 and the fourth database 44, in other words, change information of the first database and the second database of the diagnostic device 2A.

The storage unit 40A has a third database 43 and a fourth database 44 in addition to the first database and the second database.

The third database 43 stores third information that is a fault tree used in fault tree analysis. The third information includes a third abnormal event which is the sign of the abnormality occurred in the past at another plant, at least one or more third attribution events which are causes of the third abnormal event, and a third occurrence probability which is an occurrence probability of the third attribution event, based on the first database of another plant, which is received from the diagnostic device 2A, and a causal relationship between the third abnormal event and the third attribution event is indicated by a tree structure. The third information is the same fault tree as the first information in the diagnostic device 2A. The third information includes at least one or more fault trees. For example, the third information may be one fault tree for the entire plant or a fault tree for each part.

The fourth database 44 stores fourth information that is a fault tree used in fault tree analysis. The fourth information includes a fourth abnormal event which is the sign of the abnormality which is supposed to occur at another plant but does not occur yet, at least one or more fourth attribution events which are causes of the fourth abnormal event, and a fourth occurrence probability which is an occurrence probability of the fourth attribution event, based on the second database of another plant, which is received from the diagnostic device 2A, and a causal relationship between the fourth abnormal event and the fourth attribution event is indicated by a tree structure. The fourth information includes at least one or more fault trees. For example, the fourth information may include a fault tree based on knowledge concerning design and manufacture possessed by a service provider and a fault tree based on knowledge concerning operations of the operating company. For example, the second information may be one fault tree for the entire plant or a fault tree for each part.

When a sign of abnormality is detected by the diagnostic unit 51, the estimation unit 52 uses the fault tree analysis to stochastically estimate an attribution event which is the cause of the sign of abnormality related to the sensor that affects the sign of the abnormality, based on the first information, the second information, and the third information. The estimation unit 52 stochastically estimates the cause of the sign of the abnormality, by making the weighting of the first occurrence probability and the weighting of the third occurrence probability heavier than the weighting of the second occurrence probability. Since the host plant and the other plant have the same structure of the same type, the weighting of the first occurrence probability and the weighting of the third occurrence probability may be the same weighting.

For example, the weighting of the first occurrence probability and the weighting of the third occurrence probability are set to 1, and the weighting of the second occurrence probability is set to 1/10.

The estimation unit 52 may estimate the cause of the sign of abnormality, by changing the weighting of the first occurrence probability and the weighting of the third occurrence probability, according to the operation condition including the operation patterns and the types of fuel to be used of the host plant and the other plant, for example. For example, when the operation pattern of the host plant and that of the other plant are the same, the estimation unit 52 may estimate the cause of the sign of abnormality, by making the weighting of the first occurrence probability and the weighting of the third occurrence probability the same. When the operation pattern of the host plant and that of the other plant are different, the estimation unit 52 may estimate the cause of the sign of abnormality, by making the weighting of the first occurrence probability heavier than the weighting of the third occurrence probability.

For example, when the operation pattern of the host plant and that of the other plant are the same, the weighting of the first occurrence probability and the weighting of the third occurrence probability are set to 1, and the weighting of the second occurrence probability is set to 1/10. For example, when the operation pattern of the host plant and that of the other plant are different, the weighting of the first occurrence probability is set to 1, the weighting of the third occurrence probability is set to 9/10, and the weighting of the second occurrence probability is set to 1/10.

The aggregation unit 53 accesses the first database 41, the second database 42, the third database 43, and the fourth database 44 of the storage unit 40 to read and update data.

The first changing unit 55 changes at least one of the weighting of the first occurrence probability of the first attribution event, the weighting of the second occurrence probability of the second attribution event, and the weighting of the third occurrence probability of the third attribution event, based on the estimation result of the estimation unit 52.

When the cause estimated by the estimation unit 52 is the third attribution event, the first changing unit 55 changes the weighting of the third occurrence probability of the estimated third attribution event. More specifically, when the cause estimated by the estimation unit 52 is the third attribution event, the first changing unit 55 makes the weighting of the third occurrence probability of the estimated third attribution event heavier. When the weighting of the third occurrence probability is changed, the first changing unit 55 transmits the change information to the diagnostic device 2A. The diagnostic device 2A updates the corresponding first database of the diagnostic device 2A, based on the change information of the third database 43 changed by the diagnostic device 1A.

As described above, according to the present embodiment, data of a fault tree of another plant is acquired from the diagnostic device 2A of the other plant, and stored as the third database 43 and the fourth database 44. Then, according to the present embodiment, when a sign of abnormality is detected, it is possible to estimate the cause, based on the first database 41, the second database 42, and the third database 43. Further, when a sign of abnormality is detected, the cause may be estimated, based on the fourth database 44. In this way, in the present embodiment, it is possible to estimate the cause of the sign of abnormality, based on the fault tree accumulated in the diagnostic device 2A of another plant of the same structure having the same type as that of the host plant. Thus, in the present embodiment, when a sign of abnormality is detected, it is possible to estimate the cause more widely and with high accuracy.

According to the present embodiment, it is possible to estimate the cause of the sign of abnormality, by changing the weighting of the first occurrence probability and the weighting of the third occurrence probability according to the operation conditions of the host plant and the other plant. In the present embodiment, it is possible to set the occurrence probability of an abnormal event of each of the first information and the third information to an appropriate value. In this way, in the present embodiment, when a sign of abnormality is detected, it is possible to estimate the cause with high accuracy.

The diagnostic device, the diagnostic method, and the program according to the present embodiment have been described so far, but they may be implemented in various different modes other than the above-described embodiments.

The diagnostic unit 51 has been described as diagnosing abnormality using the MT method, but abnormality may be diagnosed by another known abnormality diagnostic method, for example, the nearest neighbor determination method or the vector quantization cluster analysis method.

The weighting of the first occurrence probability of the first information may be changed according to the number of occurrences of occurred attribution events.

The weighting of the second occurrence probability of the second information may be set to a predetermined occurrence probability, for example 1%, with the number of occurrences of occurred attribution events as a normal distribution.

The estimation unit 52 may stochastically estimate the cause of the sign of the abnormality by changing the weighting of the occurrence probability according to the severity of the sign of the abnormality or the degree of influence on the plant, with respect to the first information, the second information, and the third information, for example.

The diagnostic device 1 has been described as diagnosing abnormality of a plant, but without being limited thereto, may be applied to diagnosis of abnormality of parts of a plant, for example.

The third database 43 has been described as acquiring and storing fault tree data of another plant of the same structure having the same type as that of the host plant, but the present invention is not limited to this. The third database 43 may store a fault tree related to the same parts even if its type is different from that of the host plant. Thus, in the present embodiment, when a sign of abnormality occurred in a part of a plant is detected, it is possible to estimate the cause more widely and with high accuracy.

The diagnostic device 1 has been described as a device different from the collection device 102, but the diagnostic device 1 and the collection device 102 may be combined as a single device.

The use of the diagnostic device 1 is not limited to a power plant or a chemical plant, but it can be applied to a monitoring target for diagnosing a sign of abnormality based on operation data, such as a manufacturing plant.

REFERENCE SIGNS LIST

1 diagnostic device
10 reception unit
30 display unit
40 storage unit
41 first database
42 second database
43 third database
44 fourth database
50 control unit
51 diagnostic unit
52 estimation unit
54 acquisition unit
55 first changing unit
56 second changing unit
57 editing unit

The invention claimed is:

1. A diagnostic device which diagnoses a sign and a cause of abnormality of a plant, comprising:
a reception unit configured to receive from the plant, operation data indicating an operation state of the plant;
a storage unit configured to store first information including a first abnormal event which occurred in the past in the plant, at least one first attribution event that is a cause of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but has not occurred yet, at least one second attribution event that is a cause of the second abnormal event, and a second occurrence probability that is an occurrence probability of the second attribution event, in which a causal relationship between the second abnormal event and the second attribution event is indicated by a tree structure;
a diagnostic unit configured to diagnose an abnormality by detecting the sign of the abnormality in the plant, based on the operation data; and
an estimation unit configured to estimate the cause of the sign of the abnormality, based on the first information and the second information, when the sign of the abnormality is detected and diagnosed as the abnormality by the diagnostic unit,
wherein the estimation unit is further configured to estimate the cause of the sign of the abnormality by weighing the first occurrence probability more heavily than the second occurrence probability.

2. The diagnostic device according to claim 1,
wherein the plant is a first plant, the storage unit is further configured to store third information including a third abnormal event that occurred in the past in a second plant different from the first plant, at least one third attribution event which is a cause of the third abnormal event, and a third occurrence probability which is an occurrence probability of the third attribution event, in which a causal relationship between the third abnormal event and the third attribution event is indicated by a tree structure, and
wherein the estimation unit is further configured to estimate the cause of the sign of the abnormality, by weighing the first occurrence probability and the third occurrence probability more heavily than the second occurrence probability.

3. The diagnostic device according to claim 2,
wherein the first information, the second information, and the third information are fault trees, and
wherein the estimation unit is further configured to estimate the cause of the sign of the abnormality by fault tree analysis, when the sign of the abnormality is detected and diagnosed as the abnormality by the diagnostic unit.

4. The diagnostic device according to claim 2, further comprising:
a first changing unit configured to change at least one of (i) the weighing of the first occurrence probability, (ii) the weighing of the second occurrence probability, and (iii) the weighing of the third occurrence probability, based on an estimation result of the estimation unit.

5. The diagnostic device according to claim 4,
wherein the first changing unit is configured to change the weighing of the first occurrence probability, when the cause estimated by the estimation unit is the first attribution event.

6. The diagnostic device according to claim 4,
wherein the first changing unit is configured to change the weighing of the second occurrence probability, when the cause estimated by the estimation unit is the second attribution event.

7. The diagnostic device according to claim 4,
wherein the first changing unit is configured to change the weighing of the third occurrence probability, when the cause estimated by the estimation unit is the third attribution event.

8. The diagnostic device according to claim 2,
wherein the estimation unit is further configured to estimate the cause of the sign of the abnormality, by weighing the first occurrence probability and the third occurrence probability more heavily than the second occurrence probability, when an operation condition including an operation pattern and the type of fuel to be used is the same between the first plant and the second plant.

9. The diagnostic device according to claim 2, wherein the estimation unit is configured to estimate the cause of the sign of the abnormality, the weighing of the first occurrence probability more heavily than the weighing of the third occurrence probability, and the weighing of the third occurrence probability more heavily than the weighing of the second occurrence probability, when an operation condition including an operation pattern and the type of fuel to be used is different between the first plant and the second plant.

10. The diagnostic device according to claim 2, further comprising:
an editing unit that edits at least one of (i) the first information, (ii) the second information, and (iii) the third information.

11. The diagnostic device according to claim 1, further comprising:
an acquisition unit configured to acquire update information indicating that a part of the plant is updated and inspection information indicating that the plant is inspected; and
a second changing unit configured to change at least one of (i) the weighing of the first occurrence probability and (ii) the weighing of the second occurrence probability, based on at least one of (a) the update information and (b) the inspection information.

12. The diagnostic device according to claim 1, further comprising:
a display unit configured to display a diagnosis result of the diagnostic unit and an estimation result of the estimation unit.

13. The diagnostic device according to claim 12, wherein the display unit is configured to display a maintenance plan recommended in accordance with the estimation result, and
wherein when the estimation result indicates that the parts having low urgency of replacing parts are the cause of the sign of the abnormality, the estimation unit displays on the display unit the maintenance plan for replacing the parts at a periodic inspection of the plant.

14. A diagnostic method for diagnosing a sign and a cause of abnormality of a plant, comprising:
receiving from the plant, operation data indicating an operation state of the plant;
storing first information including a first abnormal event which occurred in the past in the plant, at least one first attribution event that is a cause of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but has not occurred yet, at least one second attribution event that is a cause of the second abnormal event, and a second occurrence probability that is an occurrence probability of the second attribution event, in which a causal relationship between the second abnormal event and the second attribution event is indicated by a tree structure;
diagnosing an abnormality by detecting the sign of the abnormality in the plant, based on the operation data; and
estimating the cause of the sign of the abnormality based on the first information and the second information when the sign of the abnormality is detected and diagnosed as the abnormality by the diagnosing,
wherein estimating the cause of the sign of the abnormality includes weighing the first occurrence probability more heavily than the second occurrence probability to estimate the cause of the sign of the abnormality.

15. A non-transitory computer-readable storage medium on which an executable program for diagnosing a sign and a cause of abnormality of a plant is stored, the program causing a computer to execute:
receiving from the plant, operation data indicating an operation state of the plant;
storing first information including a first abnormal event which occurred in the past in the plant, at least one first attribution event that is a cause of the first abnormal event, and a first occurrence probability that is an occurrence probability of the first attribution event, in which a causal relationship between the first abnormal event and the first attribution event is indicated by a tree structure, and second information including a second abnormal event which is supposed to occur in the plant but has not occurred yet, at least one second attribution event that is a cause of the second abnormal event, and a second occurrence probability that is an occurrence probability of the second attribution event, in which a causal relationship between the second abnormal event and the second attribution event is indicated by a tree structure;
diagnosing an abnormality by detecting the sign of the abnormality in the plant, based on the operation data; and
estimating the cause of the sign of the abnormality based on the first information and the second information when the sign of the abnormality is detected and diagnosed as the abnormality,
wherein estimating the cause of the sign of the abnormality includes weighing the first occurrence probability more heavily than the second occurrence probability to estimate the cause of the sign of the abnormality.

* * * * *